(12) United States Patent
Yoshikane

(10) Patent No.: US 12,220,752 B2
(45) Date of Patent: Feb. 11, 2025

(54) DUST COLLECTION DEVICE FOR ELECTRICALLY POWERED TOOL, AND ELECTRICALLY POWERED TOOL

(71) Applicant: MAKITA CORPORATION, Anjo (JP)

(72) Inventor: Kiyonobu Yoshikane, Anjo (JP)

(73) Assignee: MAKITA CORPORATION, Anjo (JP)

( * ) Notice: Subject to any disclaimer, the term of this patent is extended or adjusted under 35 U.S.C. 154(b) by 1220 days.

(21) Appl. No.: 16/639,982

(22) PCT Filed: Aug. 9, 2018

(86) PCT No.: PCT/JP2018/029977
§ 371 (c)(1),
(2) Date: Feb. 18, 2020

(87) PCT Pub. No.: WO2019/044453
PCT Pub. Date: Mar. 7, 2019

(65) Prior Publication Data
US 2020/0198024 A1    Jun. 25, 2020

(30) Foreign Application Priority Data

Aug. 31, 2017    (JP) .................................. 2017-167478

(51) Int. Cl.
*B23B 45/02* (2006.01)
*B23Q 11/00* (2006.01)
(Continued)

(52) U.S. Cl.
CPC .............. *B23B 45/02* (2013.01); *B23Q 11/00* (2013.01); *B25F 5/00* (2013.01); *A47L 9/102* (2013.01)

(58) Field of Classification Search
CPC .......... B25F 5/02; B25F 5/00; B01D 46/0027; B01D 46/10; B01D 45/16; B23Q 11/0046;
(Continued)

(56) References Cited

U.S. PATENT DOCUMENTS

| 10,882,155 B2 | 1/2021 | Machida et al. | |
| 2017/0203402 A1* | 7/2017 | Machida | B01D 46/10 |
| 2018/0200852 A1* | 7/2018 | Yoshikane | B23B 47/34 |

FOREIGN PATENT DOCUMENTS

| CN | 2186104 Y | 12/1994 |
| CN | 202078817 U | 12/2011 |

(Continued)

OTHER PUBLICATIONS

Nov. 6, 2018 Search Report issued in International Patent Application No. PCT/JP2018/029977.
(Continued)

Primary Examiner — Katina N. Henson
(74) Attorney, Agent, or Firm — Oliff PLC

(57) ABSTRACT

A dust collector for electric power tool includes a body case, a dust box, a nozzle, and a dust collecting route. The dust box includes a dust-collector-side exhaust port and is installable on an electric power tool. The dust box internally includes a filter. The nozzle is disposed to the body case and includes a suction opening on a front end. The dust collecting route is disposed from the suction opening to the dust-collector-side exhaust port passing through the filter. The dust box includes a box main body that includes a vibration applicator configured to directly apply a vibration to the dust box by a rotating operation of an operation knob.

3 Claims, 19 Drawing Sheets

(51) Int. Cl.
*B25F 5/00* (2006.01)
*A47L 9/10* (2006.01)

(58) Field of Classification Search
CPC ..... B23Q 11/0071; B23Q 11/00; A47L 9/102; B23B 45/02
USPC .......................................................... 15/347
See application file for complete search history.

(56) References Cited

FOREIGN PATENT DOCUMENTS

| | | | |
|---|---|---|---|
| CN | 205412498 U | 8/2016 | |
| CN | 107053098 A | 8/2017 | |
| EP | 2011992 A2 * | 1/2009 | ......... B01D 46/0075 |
| JP | S50-084041 A | 7/1975 | |
| JP | 2006-006559 A | 1/2006 | |
| JP | 2010-017378 A | 1/2010 | |
| JP | 2011-188952 A | 9/2011 | |
| JP | 2012-236272 A | 12/2012 | |
| JP | 5739268 B2 | 6/2015 | |

OTHER PUBLICATIONS

Aug. 23, 2021 Office Action issued in Chinese Patent Application No. 201880055531.7.
Mar. 22, 2021 Office Action issued in Chinese Patent Application No. 201880055531.7.
May 11, 2021 Office Action issued in Japanese Patent Application No. 2017-167478.
Mar. 3, 2020 International Preliminary Report on Patentability issued in International Patent Application No. PCT/JP2018/029977.

* cited by examiner

DUST COLLECTION DEVICE FOR ELECTRICALLY POWERED TOOL, AND ELECTRICALLY POWERED TOOL

TECHNICAL FIELD

The present invention relates to a dust collector for electric power tool installed on an electric power tool, such as an electric drill and a hammer drill, and an electric power tool to which the dust collector is installed.

BACKGROUND ART

To an electric power tool, such as an electric drill and a hammer drill, a dust collector that collects dust generated from a workpiece during a drilling work and the like is installed. That is, in a structure, an air containing dust is suctioned inside a body case of the dust collector to be passed through a filter in a dust box, thereby capturing the dust by the filter to accumulate the dust in the dust box.

In the conventional dust collector, since the air is flown backward on a dust collecting route from a suction opening on a tool bit side to the filter, the dust is possibly accumulated on an intermediate position of the dust collecting route, or the dust is possibly blown out from the suction opening by the backwardly flowing air. Accordingly, the dust collecting route needs to be processed to avoid movement of the dust to the suction opening side, thus leading to cost increase.

Therefore, it is an object of the present invention to provide a dust collector for electric power tool and an electric power tool configured to easily prevent filter clogging at low cost.

SOLUTIONS TO THE PROBLEMS

To achieve the above-described object, the invention according to first aspect is a dust collector for electric power tool that includes a body case that has an exhaust outlet and is installable on an electric power tool, a dust box internally includes a filter, a nozzle that is disposed to the body case and has a suction opening at a front end, a dust collecting route from the suction opening to the exhaust outlet passing through the filter, and a vibration application unit that applies a direct or indirect vibration to the dust box.

In this case, the vibration application unit is preferred to be disposed to the dust box.

The vibration by the vibration application unit is preferred to be applied parallel to a ventilation direction to the filter.

The vibration application unit is preferred to include an operating member and apply the vibration in accordance with a rotating operation of the operating member.

The vibration application unit is preferred to include a cam unit configured to convert a rotation in accordance with the rotating operation of the operating member into a back and forth movement of a hammering element to generate the vibration.

The vibration application unit is preferred to include a base in a shape of a cylinder with a closed bottom and a support shaft, the base is secured to the dust box side and has an open front side, the support shaft is penetratingly secured to a center of the base, the support shaft projects forward, and the operating member is preferred to rotatably disposed on a front end of the support shaft.

The cam unit is preferred to include the hammering element, a cam, and a coil spring, the hammering element is passed through by the support shaft, the hammering element is movable back and forth in an axial direction, the cam is passed through by the support shaft at a rear of the hammering element, the cam is secured to a bottom surface of the base, and the coil spring presses the hammering element to the cam side.

An accelerator configured to accelerate the rotation of the operating member is preferred to be included.

The accelerator is preferred to include a carrier, a plurality of planetary gears, and an internal gear, the carrier is secured to the operating member, the plurality of planetary gears are supported to the carrier via pins, the internal gear is held onto the dust box side, and the planetary gears are meshed with the internal gear.

The vibration application unit is preferred to be disposed to a front surface lower portion in a posture of being installed on the electric power tool.

The dust box is preferred to be attachably and detachably installed on the body case.

The dust box is preferred to include a box main body in a shape of a deep bottom box and a lid body in a square frame shape, the box main body has an open rear surface, and the lid body is rotatably coupled to the open side and a lower side of the box main body by a hinge shaft.

To achieve the above-described object, the invention according to second aspect is an electric power tool that includes the dust collector for electric power tool according to first aspect installed thereon.

EFFECTS OF THE INVENTION

According to the present invention, the accumulated dust can be effectively removed by applying the vibration to the filter with the vibration application unit. Accordingly, the filter clogging can be easily prevented at low cost.

Especially, by disposing the vibration application unit to the dust box, the vibration can be effectively applied to the filter, and improvement of the effect to prevent the clogging can be expected.

Especially, by applying the vibration parallel to the ventilation direction to the filter, the vibration effective to remove the dust can be applied to a ventilation surface of the filter to which the dust is easily accumulated.

Especially, by applying the vibration in accordance with the rotating operation of the operating member, the vibration can be applied to the dust box with a simple operation.

Especially, by including the cam unit configured to convert the rotation in accordance with the rotating operation of the operating member into the back and forth movement of the hammering element to generate the vibration, the rotating operation can be converted into the back and forth movement of the hammering element to efficiently generate the vibration. In addition, the vibration application unit can be compactly formed.

Especially, by including the accelerator configured to accelerate the rotation of the operating member, the back and forth movement of the hammering element can be increased via the accelerator even with a little rotating operation of the operating member, and the dust can be effectively removed even with the rotating operation for a short period.

Especially, by disposing the vibration application unit on the front surface lower portion in the posture of being installed on the electric power tool, the vibration application unit is less likely to hinder the work even if the vibration application unit projects from the dust collector for electric power tool.

DESCRIPTION OF PREFERRED EMBODIMENTS

The following describes embodiments of the present invention based on the drawings.

Figure 1:
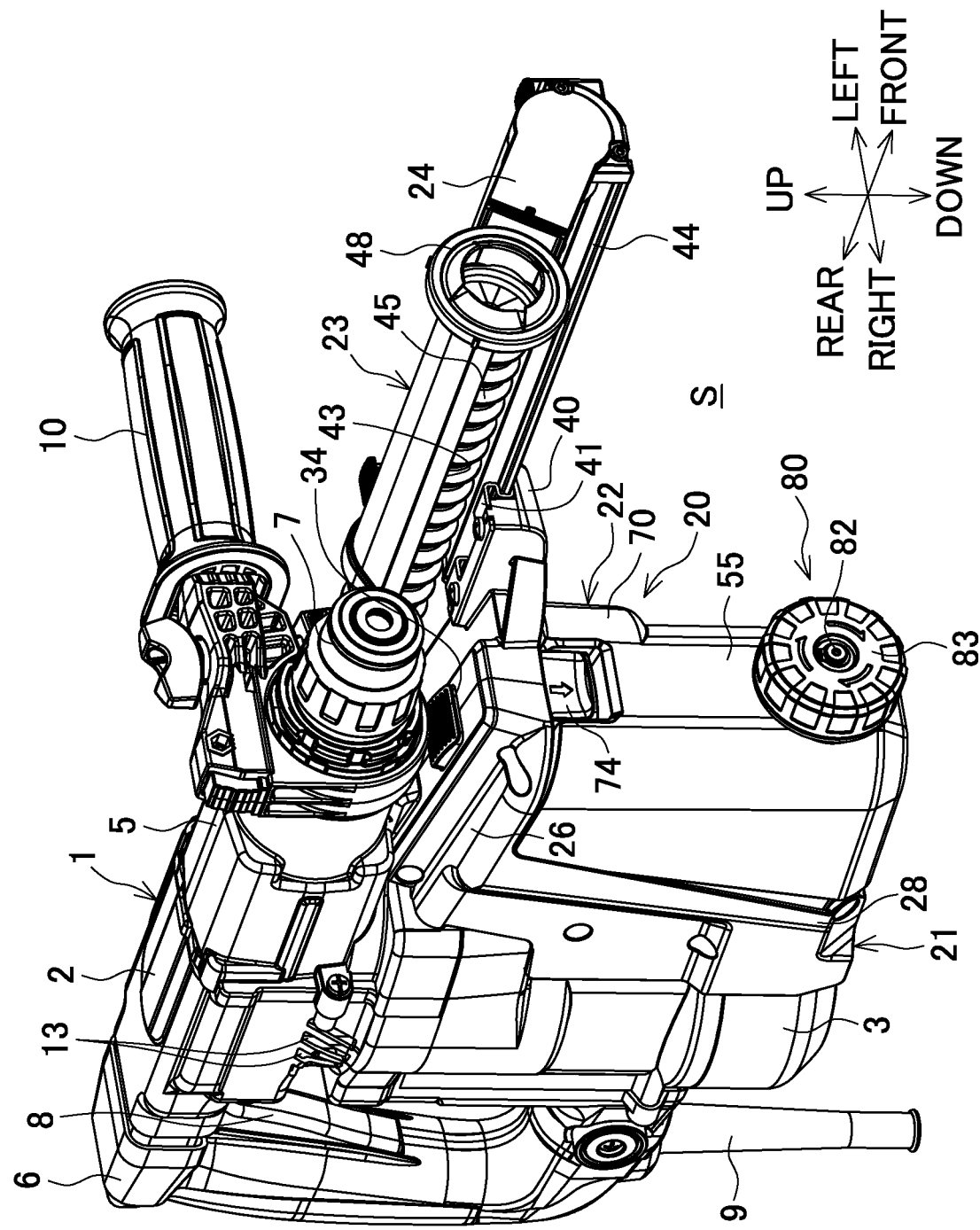
FIG. 1 is a perspective view of a dust collection system from a front side.
Figure 2:
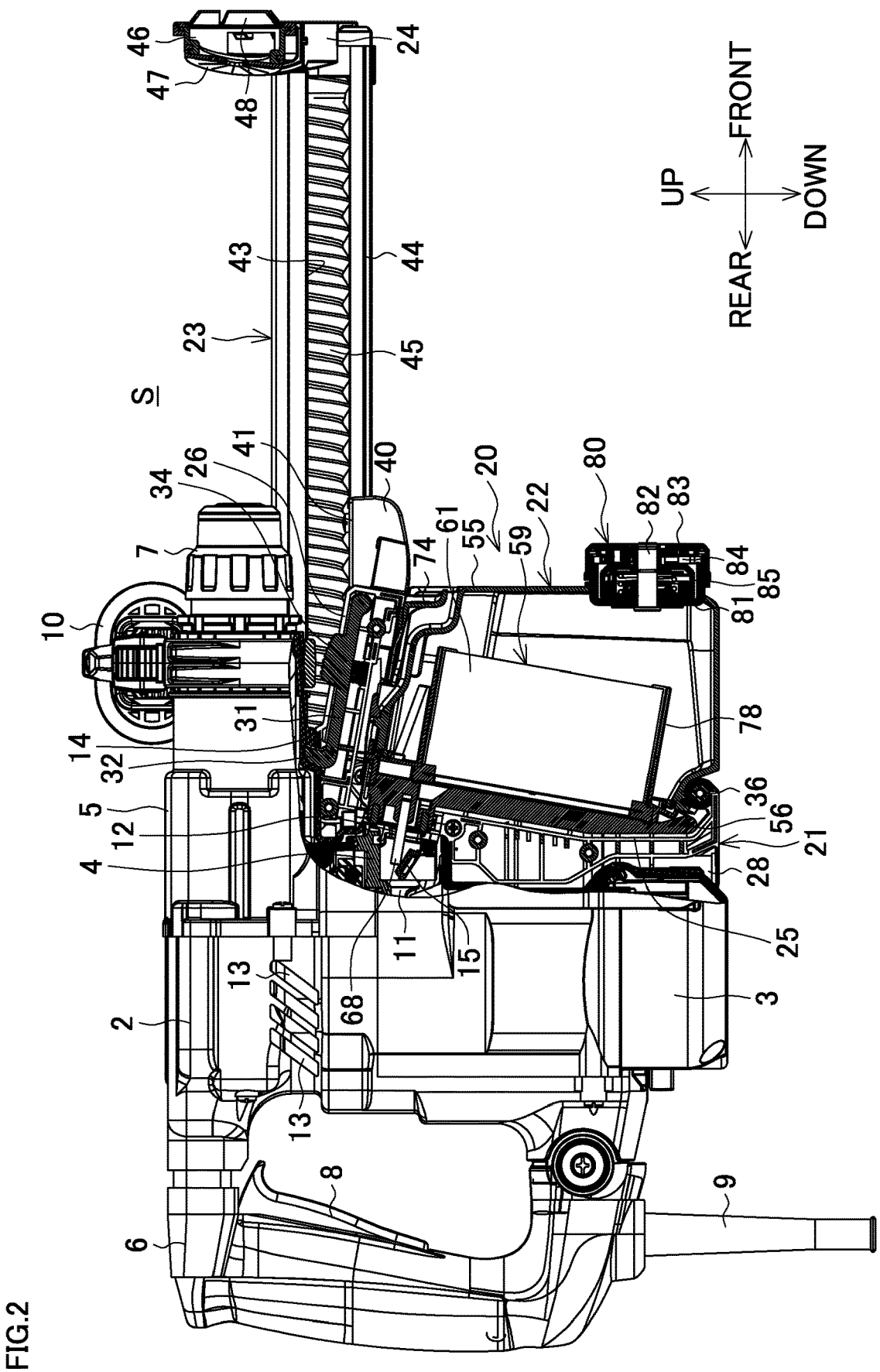
FIG. 2 is a side view of the dust collection system illustrating a part of a dust collector for electric power tool and a hammer drill on a cross section.
Figure 3:
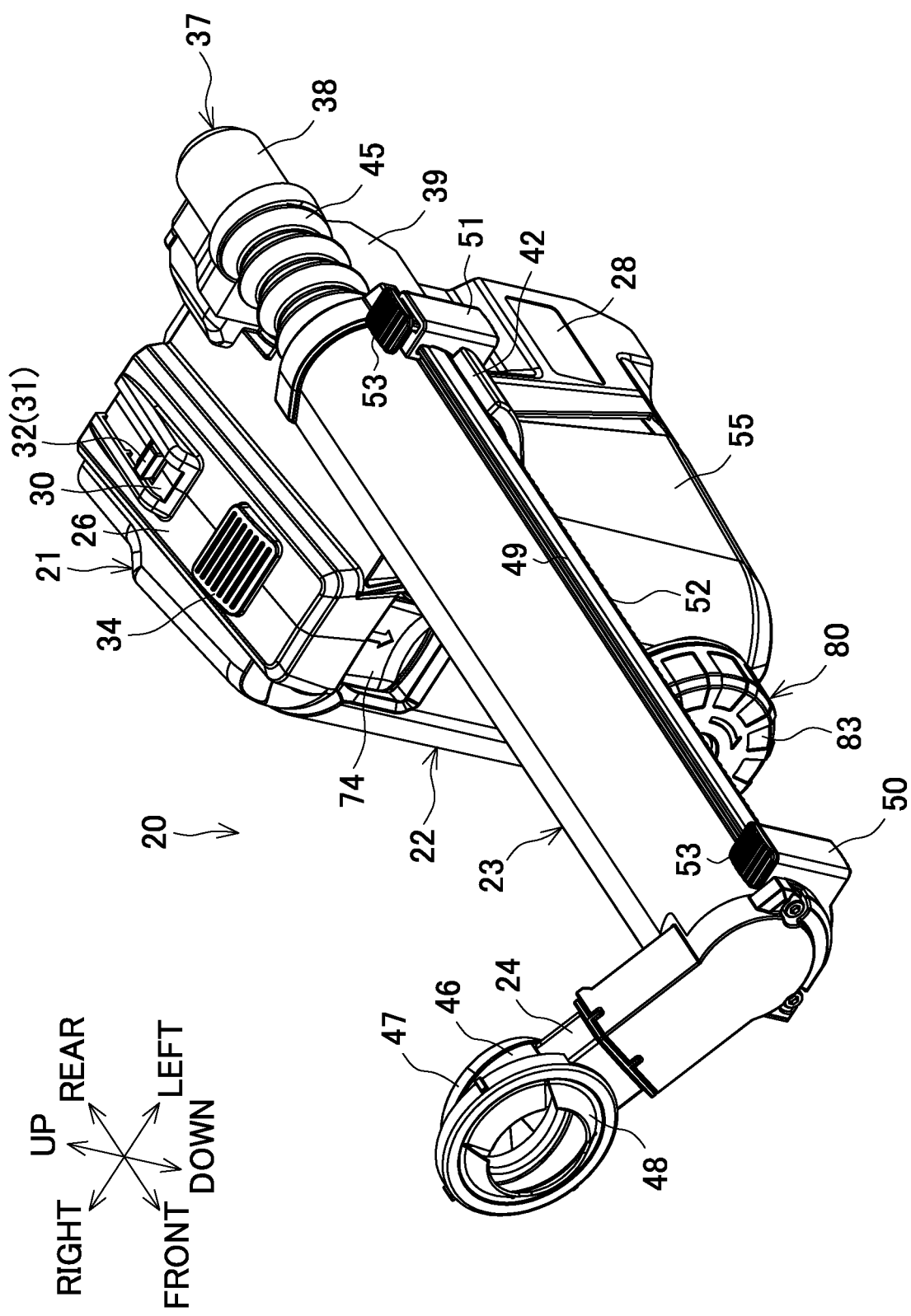
FIG. 3 is a perspective view of the dust collector for electric power tool from a front side.
Figure 4:
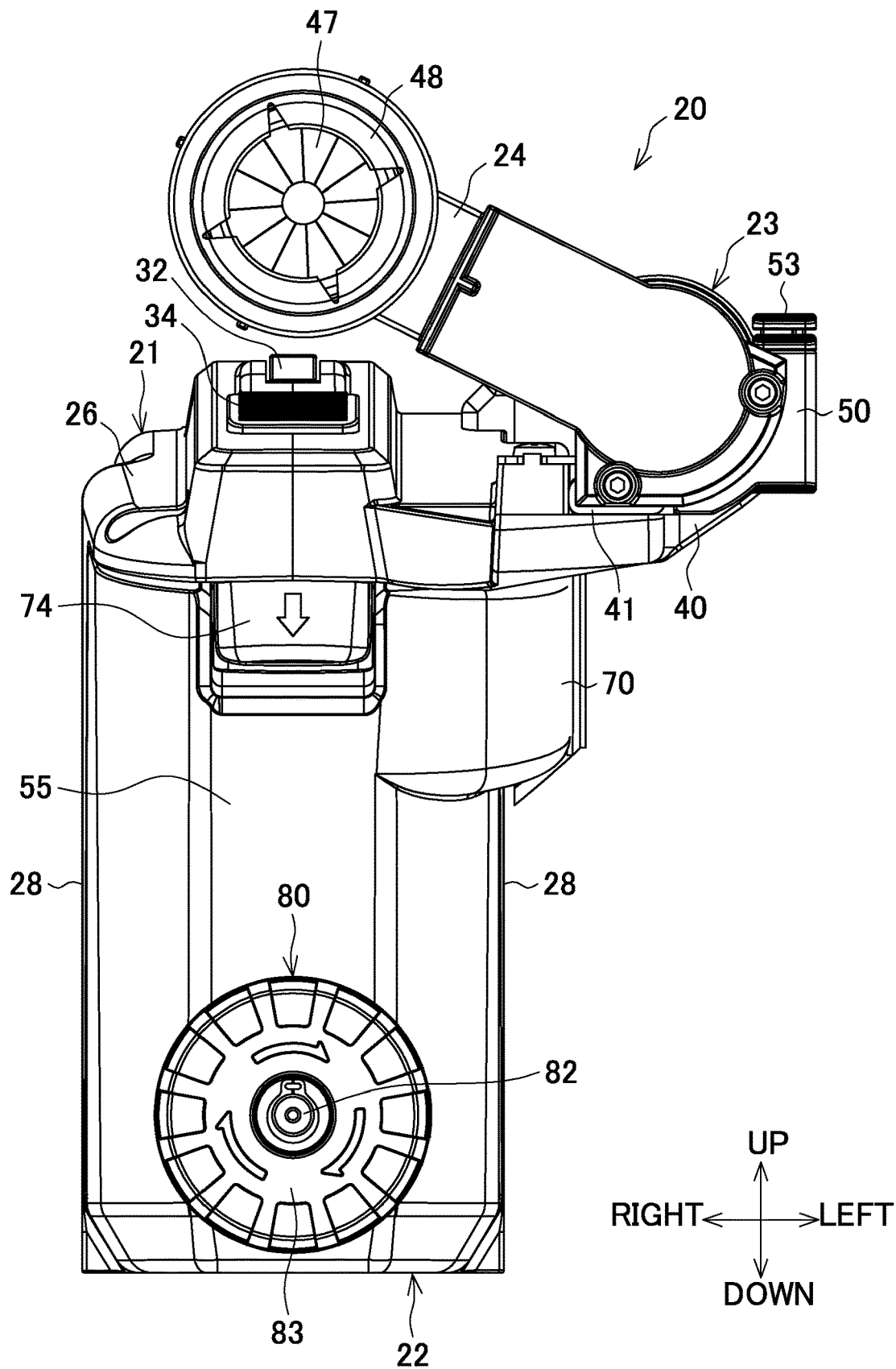
FIG. 4 is a front view of the dust collector for electric power tool.
Figure 5:
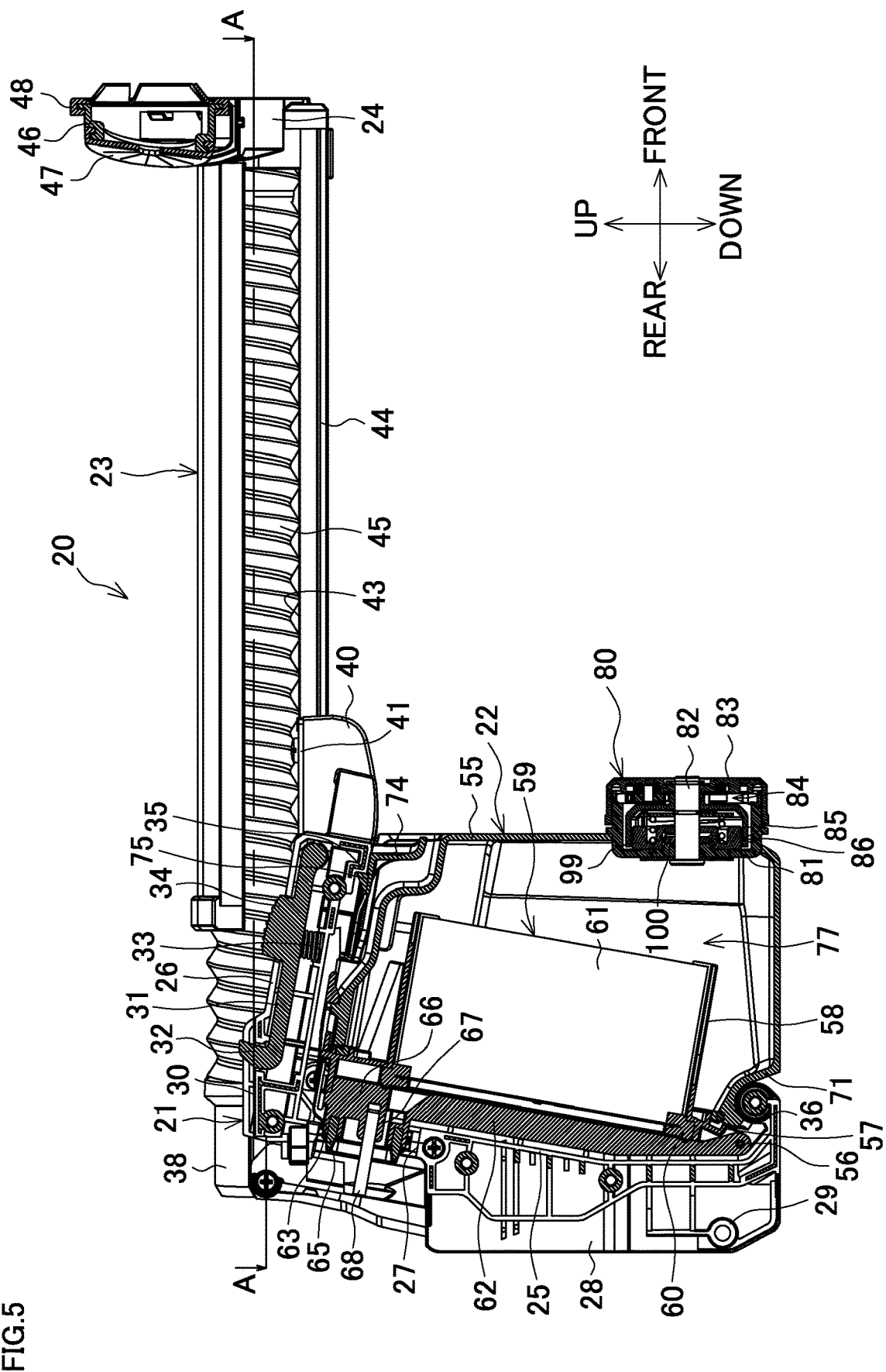
FIG. 5 is a center vertical cross-sectional view of the dust collector for electric power tool.
Figure 6:
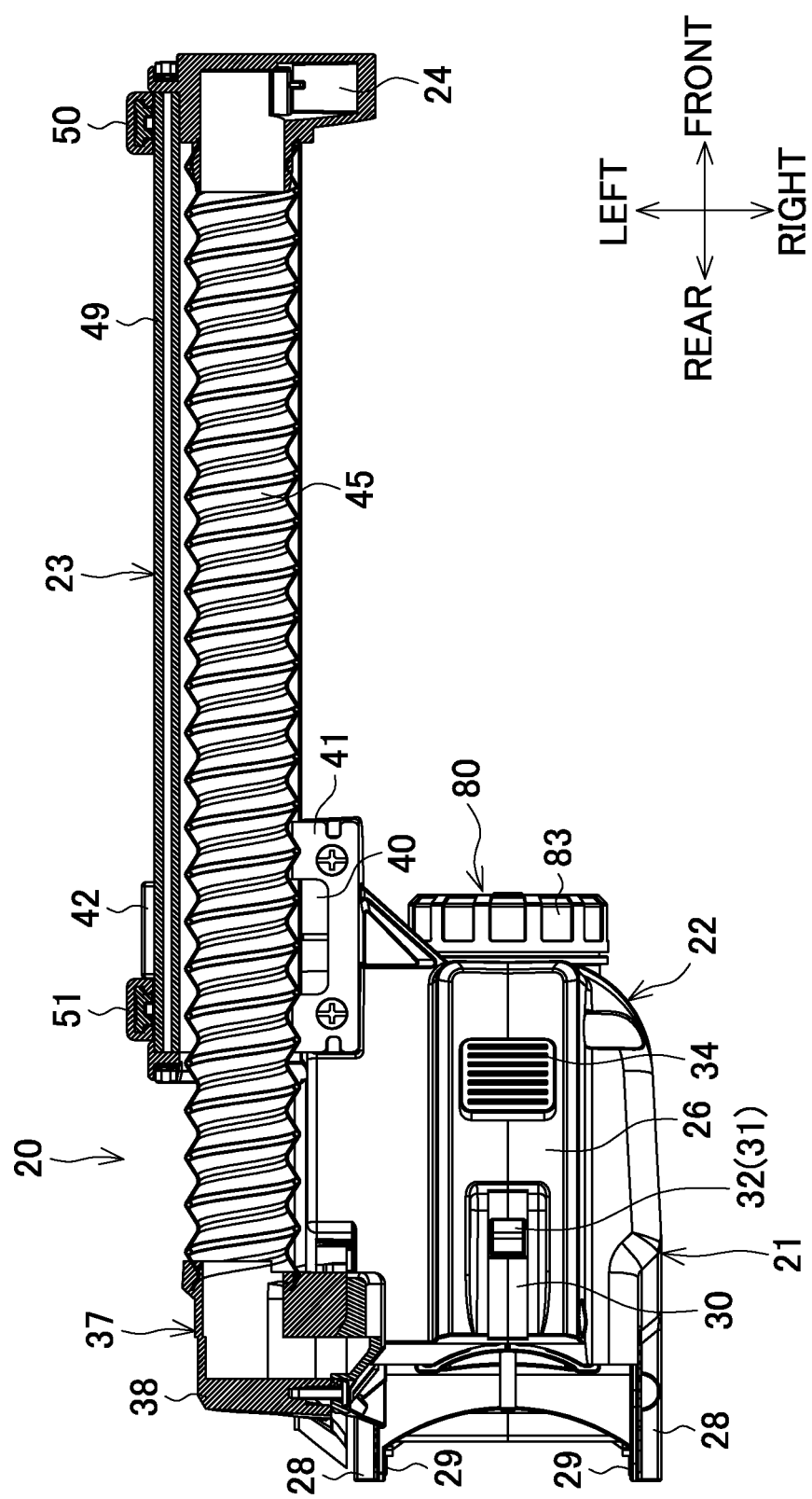
FIG. 6 is a cross-sectional view taken along a line A-A of FIG. 5.

FIGS. 1 and 2 illustrate an exemplary dust collection system S where a dust collector for an electric power tool (hereinafter simply referred to as a "dust collector") 20 is installed on a hammer drill 1 as an electric power tool. FIG. 1 is a perspective view from a front side, and FIG. 2 is a side view illustrating a part on a cross section.

(Description of Hammer Drill)

The hammer drill 1 includes a motor housing 3 coupled to a front lower portion of a main body housing 2 in an up-down direction, and a gear housing 4 on an upper side of the motor housing 3. The motor housing 3 houses a motor (not illustrated) having an output shaft facing upward. The gear housing 4 houses a crank mechanism and a rotation mechanism. On a front side of the gear housing 4, a front housing 5, which houses a tool holder facing forward, is assembled, and a handle housing 6 having a U shape in side view is coupled to a rear portion of the main body housing 2. The tool holder has a distal end to which a tool bit, such as a drill bit, is installable by an operation sleeve 7. A switch lever 8 is disposed to a switch internally included in the handle housing 6, a power supply cord 9 is a power supply cord, and a side handlebar 10 is installed to the front housing 5.

The tool holder includes a hammering mechanism that includes a piston reciprocated by a connecting rod of the crank mechanism. The main body housing 2 includes a change lever (not illustrated) on a left side surface, and a hammer mode, a drill mode, and a hammer drill mode are selectable with use of the change lever. In the hammer mode, the hammering mechanism is operated to provide a hammering on the tool bit. In the drill mode, the rotation mechanism is operated to rotate the tool bit with the tool holder. In the hammer drill mode, the hammering mechanism and the rotation mechanism are simultaneously operated to provide the hammering and the rotation to the tool bit.

The motor housing 3 internally includes a fan housing chamber 11 that houses a fan disposed to the output shaft of the motor. An upper inlet 12 communicated with the fan housing chamber 11 is formed on a front surface of the motor housing 3, and a lower inlet (not illustrated) is formed on a lower back surface of the main body housing 2. Side exhaust outlets 13, 13 . . . , which pass through between the main body housing 2 and the gear housing 4 to be communicated with the fan housing chamber 11, are formed on right and left side surfaces of the main body housing 2.

Furthermore, a receiving portion (not illustrated) for installing the dust collector 20 is disposed to right and left on a front lower portion of the motor housing 3, and a stop 14 is disposed to protrude downward on a lower surface of the front housing 5.

(Description of Dust Collector)

As illustrated in FIGS. 3 to 6, the dust collector 20 includes a body case 21 installed on the hammer drill 1, a dust box 22 attachably and detachably installed on the body case 21, and a sliding portion 23 that is coupled to the body case 21 and has a distal end on which a nozzle 24 is disposed.

First, the body case 21 has an inverted L shape in side view where an upper side portion 26 is disposed to face forward on an upper end of a rear side portion 25. The rear side portion 25 has a vertically elongated plate shape having a front side as a mounting portion of the dust box 22 and a rear side as a mounting portion to the hammer drill 1. A square hole 27 is penetratingly formed at a position in the rear side portion 25 corresponding to the upper inlet 12 of the hammer drill 1. Side plate parts 28, 28 are disposed to right and left of the rear side portion 25, and locking shafts 29, 29, which are engaged with the receiving portion disposed to the motor housing 3 of the hammer drill 1, are disposed to protrude on lower inner surfaces of the side plate parts 28, 28 at the rear of the rear side portion 25.

The upper side portion 26 has a top surface on which a guide groove 30 is depressed in a front-rear direction to receive the stop 14 of the front housing 5 in installation on the hammer drill 1, and below the guide groove 30 inside the upper side portion 26, a swing plate 31 is disposed sideways.

The swing plate 31 is swingable up and down having a front end rotatably supported in the upper side portion 26, and the swing plate 31 can appear in the guide groove 30 having a rear end to which a hook 32 disposed to face upward. The swing plate 31 is biased to an upward position where the hook 32 projects into the guide groove 30 by a coil spring 33. At the center of a top surface of the swing plate 31, a button 34 is disposed to project to the top surface of the upper side portion 26. Accordingly, performing a push-in operation on the button 34 to swing the swing plate 31 to a downward position causes the hook 32 to retreat downward from the guide groove 30.

Meanwhile, a locking stepped portion 35, to which an attaching/detaching locking claw 75 of the dust box 22 described later is elastically locked, is formed on a front lower surface of the upper side portion 26. A shaft portion 36, to which a receiving depressed portion 71 of the dust box 22 is configured to be fitted, is formed in a right-left direction on a lower front surface of the rear side portion 25.

The body case 21 includes an intermediate cylinder 37 on the upper side of the left side. The intermediate cylinder 37 includes a receiving cylinder portion 38 and a guide cylinder portion 39. The receiving cylinder portion 38 is disposed on the upper end to open forward. The guide cylinder portion 39 is disposed downward from the receiving cylinder portion 38 along the left side of the body case 21, subsequently folded forward, and open forward at the lower end.

Furthermore, ahead of the intermediate cylinder 37 and on the upper side of the left side surface of the body case 21, a supporting arm 40 is disposed. The supporting arm 40 projects obliquely forward from the body case 21, and slidably supports the sliding portion 23 via a guide metal fitting 41 secured to the top surface. The supporting arm 40 has a distal end as a middle stopper 42 that goes around the sliding portion 23 to the left outer side and faces upward.

The sliding portion 23 is a hollow cylindrical body that has a front end to which the nozzle 24 is coupled approximately orthogonally to the right side. The sliding portion 23 has a right surface on which a slit 43 is formed in the front-rear direction, and has a lower surface on which a guide rail 44 having an inversed T shape on a transverse surface is integrally disposed along a longer side direction. The guide rail 44 is slidably supported in the front-rear direction by the guide metal fitting 41, thereby making the sliding portion 23 slidable back and forth.

The nozzle 24 has a base end projecting to the inside of the sliding portion 23, and a front end of an accordion-shaped flexible hose 45 disposed in the sliding portion 23 is coupled to the base end of the nozzle 24. The flexible hose 45 has a rear end coupled to the receiving cylinder portion 38 on the rear side.

On the distal end of the nozzle 24, a ring-shaped suction opening 46, through which a tool bit passes, is disposed. The suction opening 46 includes a rear opening to which a rubber cap 47 is fitted, and a front opening to which an obstructing ring 48 is attachably and detachably fitted. The rubber cap 47 has a plurality of cuts formed radially from a through-hole on the center. The obstructing ring 48 is made of rubber and obstructs between a surface to be processed and the suction opening 46 in a state of being in contact with the surface to be processed.

Meanwhile, on a left surface of the sliding portion 23, a rail 49 is disposed over the whole length in parallel. A front stopper 50 and a rear stopper 51, which are engaged with the rail 49 from the upper and lower sides and slidable along the rail 49, are disposed on a front side and a rear side across the middle stopper 42 of the supporting arm 40. On the lower surface of the rail 49, a rack 52 that includes a plurality of teeth is disposed. The front and rear stoppers 50 and 51 each include a lock button 53 projecting to be biased upward in a state of being meshed with the rack 52. Accordingly, when the lock button 53 is pushed to release the meshing with the rack 52, the front and rear stoppers 50 and 51 become to be slidable along the rail 49. When the push of the lock button 53 is released, the lock button 53 returns to the position projecting upward to be meshed with the rack 52, thus restricting the slide of the front and rear stoppers 50 and 51.

Accordingly, the sliding portion 23 is held movable back and forth on the upper left side of the body case 21 within a range where the front and rear stoppers 50 and 51 are in contact with the middle stopper 42 in a state where the guide metal fitting 41 restricts the rotation of the sliding portion 23 via the guide rail 44. With the movement of the sliding portion 23 to back and forth, the flexible hose 45 expands and contracts between the base end of the nozzle 24 and the receiving cylinder portion 38 of the intermediate cylinder 37. However, on the lower surface side of the sliding portion 23 of the supporting arm 40, a reel (not illustrated) around which a spiral spring is wound is disposed, and a distal end of the spiral spring is coupled to the rear end of the sliding portion 23. Therefore, the sliding portion 23 in the ordinary state is biased to an advance position where the rear stopper 51 abuts on the middle stopper 42 due to a tensile force of the spiral spring.

Next, a description will be given of the dust box 22 while specifying the up-down direction and the right-left direction in a posture installed on the dust collector 20.

Figure 7:
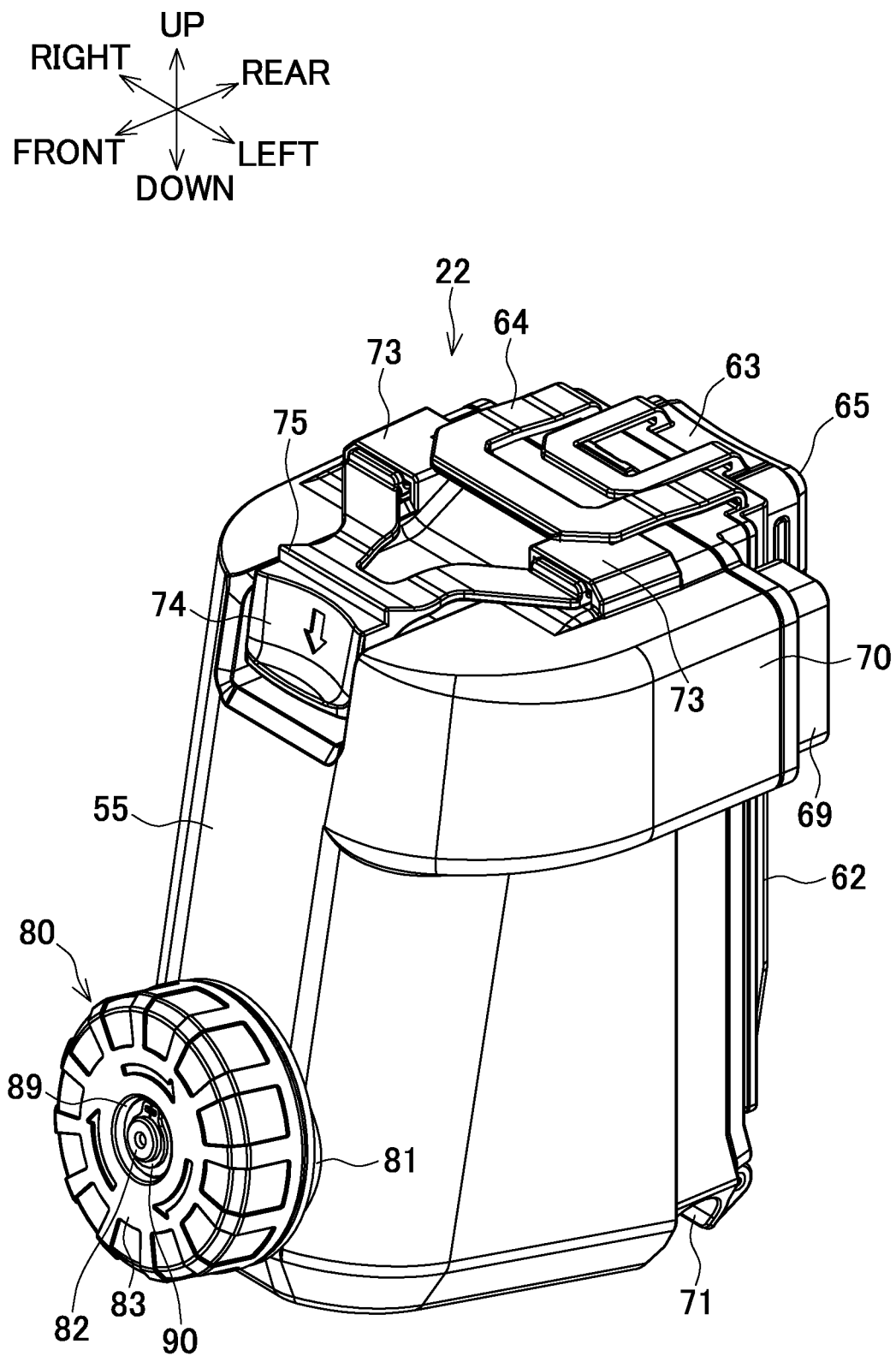
FIG. 7 is a perspective view of a dust box.
Figure 8:
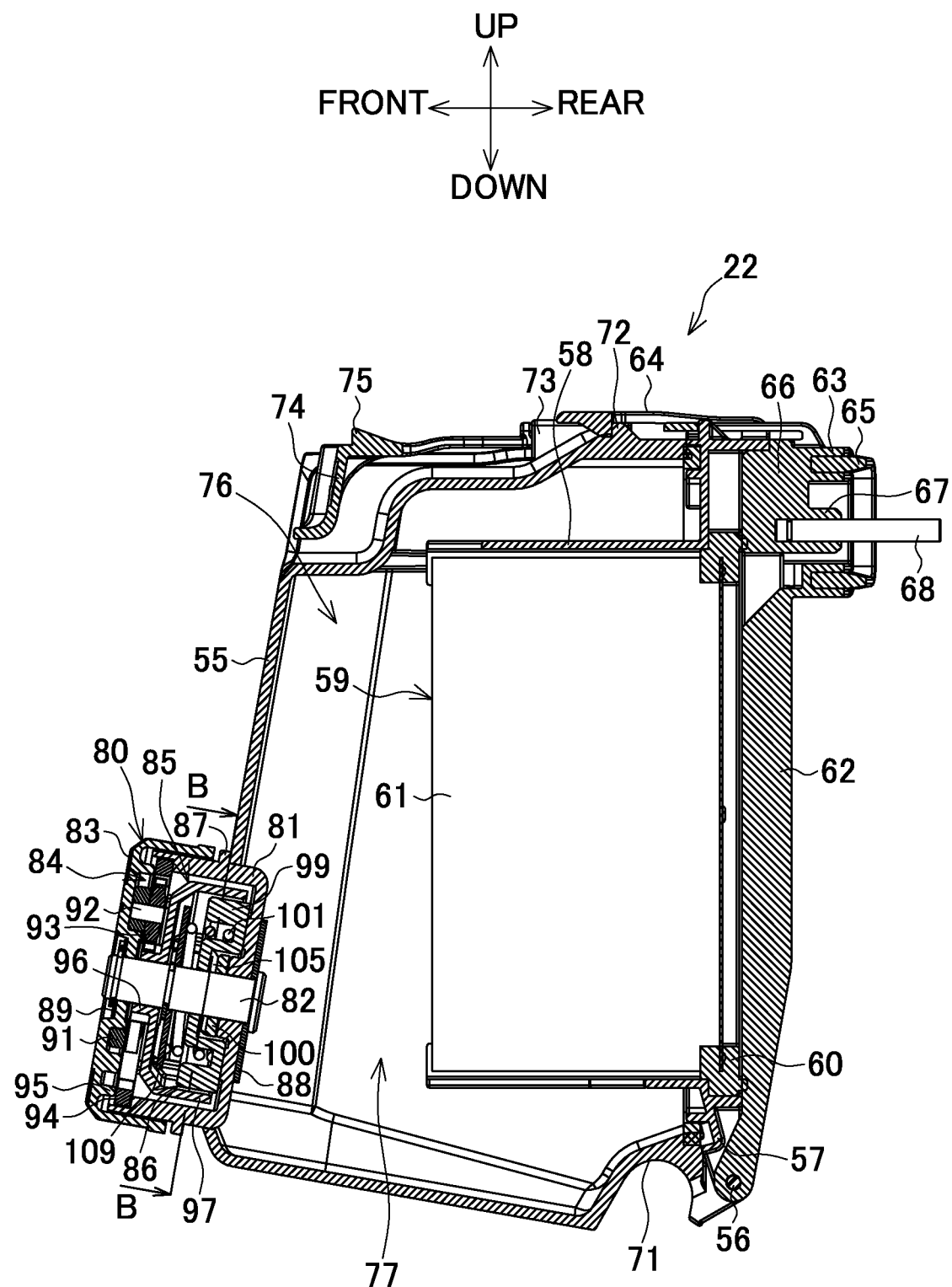
FIG. 8 is a center vertical cross-sectional view of the dust box.

As illustrated in FIGS. 7 and 8, the dust box 22 includes a box main body 55 that has an open rear surface and a shape of a deep bottom box, and a square frame-shaped lid body 57 rotatably coupled to an open side and lower side of the box main body 55 by a hinge shaft 56.

The lid body 57 integrally includes a filter housing portion 58 that projects to an inside of the box main body 55 in a state where the opening of the box main body 55 is closed. The filter housing portion 58 is small by one size compared with the box main body 55 and has a square cylinder shape. The filter housing portion 58 internally houses a filter unit 59 that includes a rectangular framing body 60 and a paper filter 61. The framing body 60 is fitted to the opening of the lid body 57 side. The filter 61 has folds parallel to the longer side direction (up-down direction) of the framing body 60 to be folded in the shorter side direction (right-left direction).

The lid body 57 is covered with a cap cover 62 from the rear side. A dust-collector-side exhaust port 63 in a cornered cylinder shape is formed to be opened near the upper end on the rear surface of the cap cover 62, and a loop portion 64 extending forward on the upper side of the box main body 55 is formed on the top surface.

Furthermore, the dust-collector-side exhaust port 63 of the lid body 57 has a rear end on which a sealing member 65 is disposed over the whole circumference. A U-shaped crossover piece 66 is disposed to be inwardly depressed inside the dust-collector-side exhaust port 63, and the crossover piece 66 has a bottom portion on which a retention boss 67 is disposed to face rearward. A metal contact pin 68 is inserted into the retention boss 67, and the contact pin 68 passes through the dust-collector-side exhaust port 63 and the sealing member 65 to project to face rearward. The dust-collector-side exhaust port 63 communicates with the inside of the filter housing portion 58 from the lower side of the crossover piece 66.

On the upper left side of the lid body 57, a square cylinder 69 is disposed perpendicular to the lid body 57 to project into the box main body 55. The square cylinder 69 has an open rear end and is coupled to the guide cylinder portion 39 of the intermediate cylinder 37 in a state of being coupled to the body case 21 of the dust collector 20.

Meanwhile, on the upper left side of the box main body 55, a guide passage 70 is disposed to project out to the outer surface along a circumferential direction. The guide passage 70 has a shape of a circular arc groove and houses the square cylinder 69. However, the guide passage 70 is disposed to be gradually shallowed toward forward, and continuously coupled to the front surface of the box main body 55 ahead of the filter housing portion 58.

On the lower surface of the box main body 55, the receiving depressed portion 71 parallel to the hinge shaft 56 is disposed. On the vicinity of the opening on the top surface of the box main body 55, a lid locking claw 72, to which the loop portion 64 of the cap cover 62 is elastically locked in a state where the lid body 57 is closed, is disposed. Similarly on the top surface thereof, a pair of holders 73, 73 disposed to protrude on the right and left of the lid locking claw 72 hold a bifurcated base portion, and an operating member 74, which has a distal end as an L-shaped elastic piece, is disposed. On the top surface of the operating member 74, an attaching/detaching locking claw 75 is disposed.

Accordingly, when the opening of the box main body 55 is closed by the lid body 57, the square cylinder 69 of the lid body 57 fits to the guide passage 70 of the box main body 55, and in the dust box 22, the air suctioned from the square cylinder 69 swirls along the front side inner circumference of the box main body 55 from the guide passage 70, thus forming a swirling flow passage 76 going around to the front side of the filter housing portion 58. The box main body 55 internally includes a dust collecting chamber 77 communicated with the square cylinder 69.

The dust box 22 formed as described above is pushed into the body case 21 from the front of the body case 21 in a direction where the lid body 57 comes backward and the receiving depressed portion 71 comes to the lower side. Then, the intermediate cylinder 37 of the body case 21 is coupled to and communicated with the front end of the square cylinder 69 of the dust box 22. Simultaneously, the dust-collector-side exhaust port 63 disposed on the lid body 57 passes through the square hole 27 of the body case 21 to project rearward. In this state, the contact pin 68 also projects rearward from the square hole 27.

(Description of Vibration Applicator)

Figure 9:
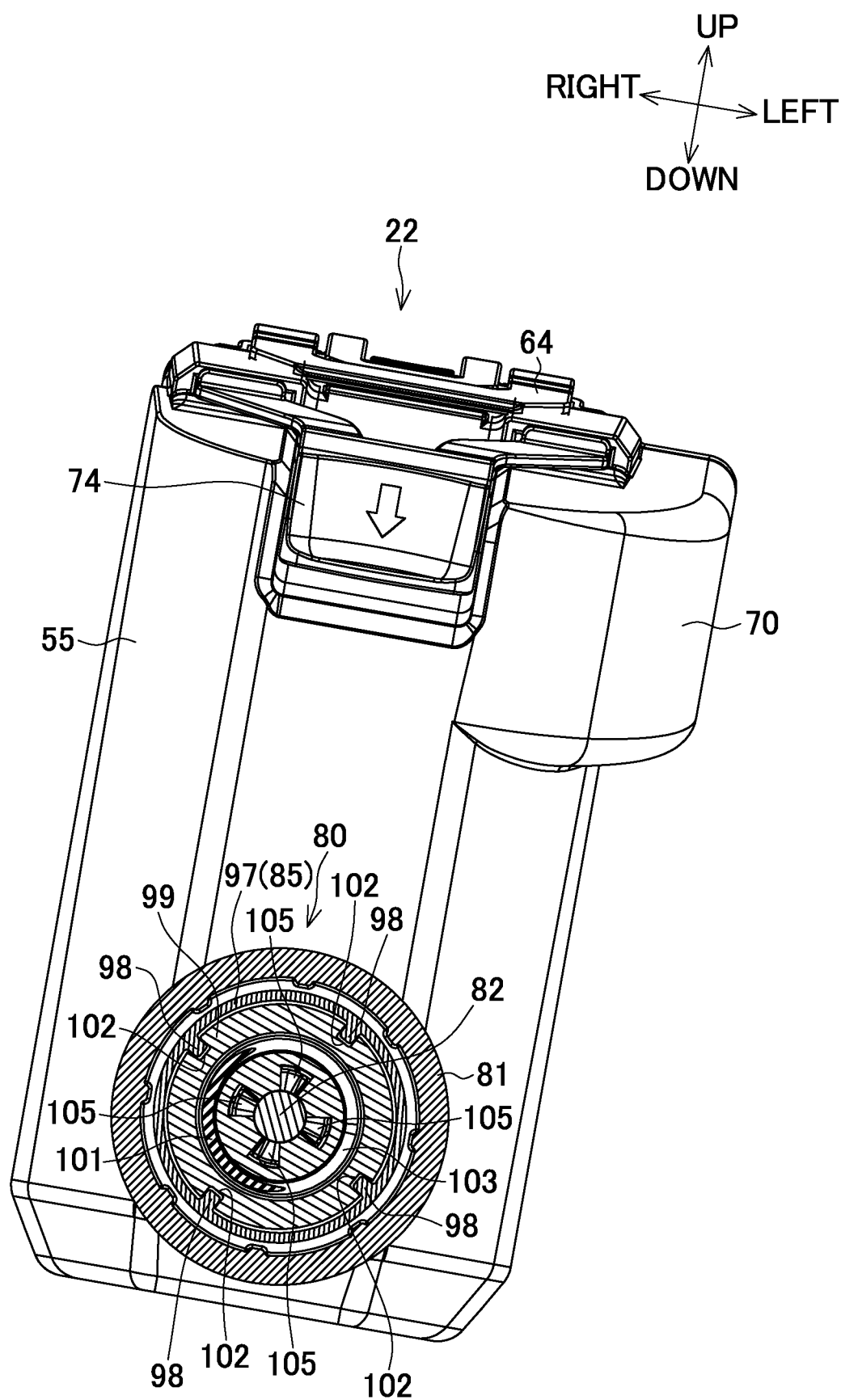
FIG. 9 is a cross-sectional view taken along a line B-B of FIG. 8.
Figure 10A:
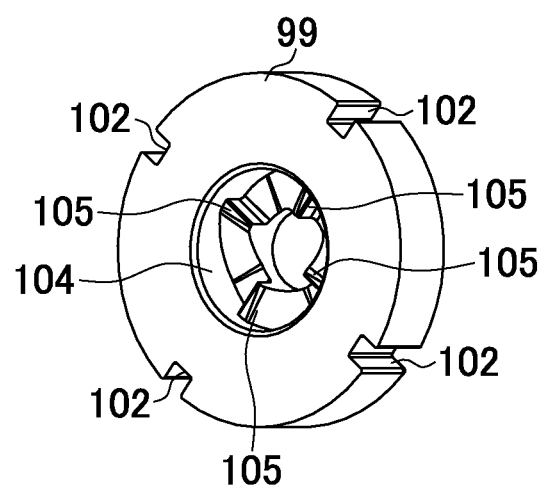
FIG. 10A is a perspective view of a hammer from a rear side.
Figure 10B:
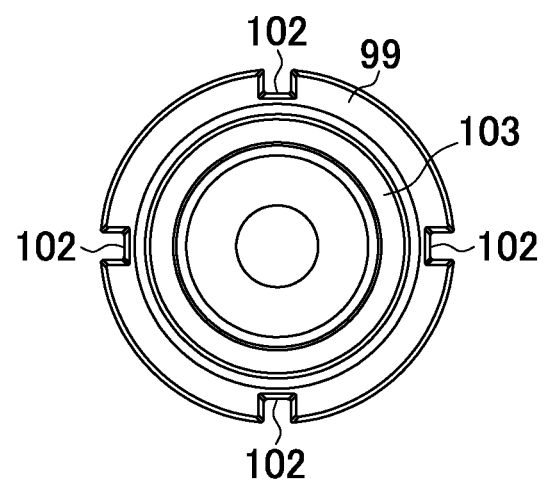
FIG. 10B is a front view of the hammer.
Figure 10C:
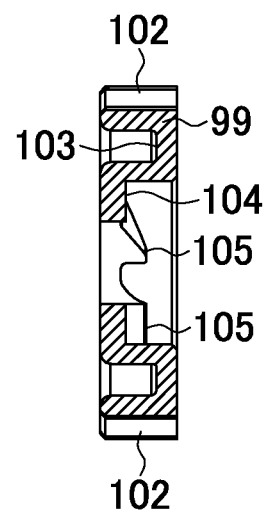
FIG. 10C is a center vertical cross-sectional view of the hammer.
Figure 10D:
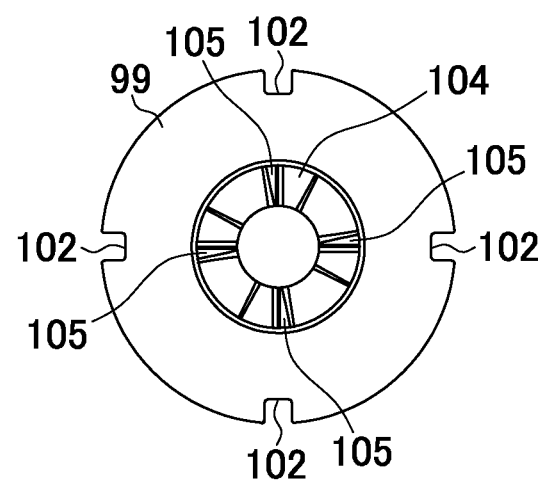
FIG. 10 D is a back view of the hammer.
Figure 11A:
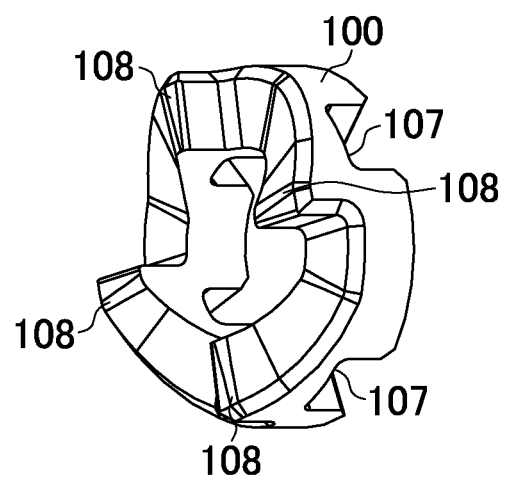
FIG. 11A is a perspective view of a cam from a front side.
Figure 11B:
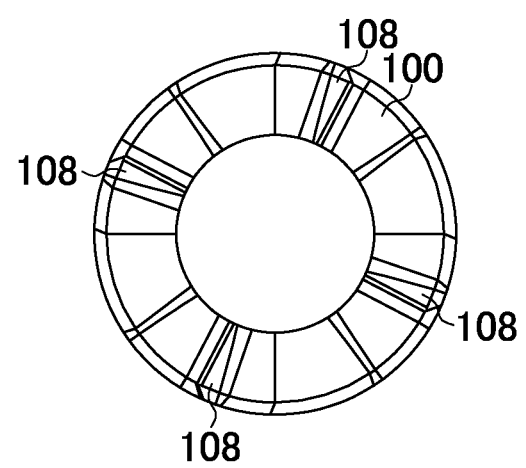
FIG. 11B is a front view of the cam.
Figure 11C:
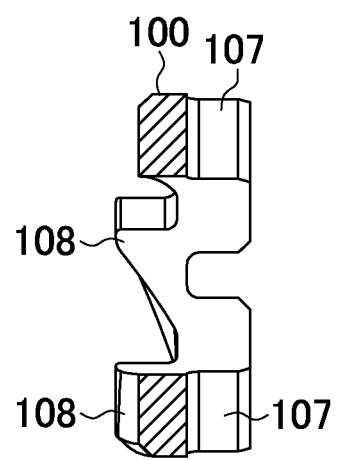
FIG. 11C is a center vertical cross-sectional view of the cam.
Figure 11D:
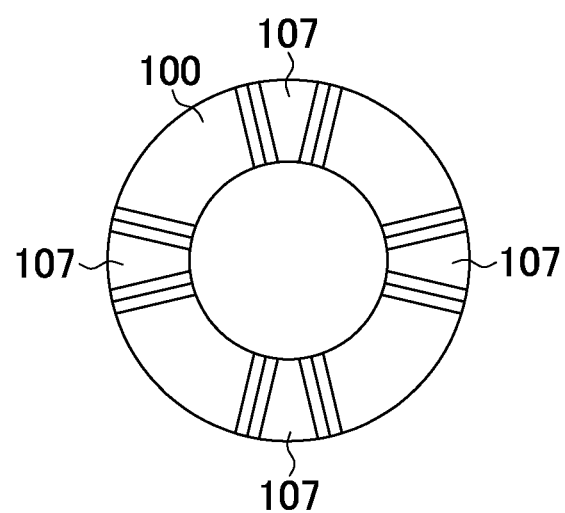
FIG. 11D is a back view of the cam.
Figure 12A:
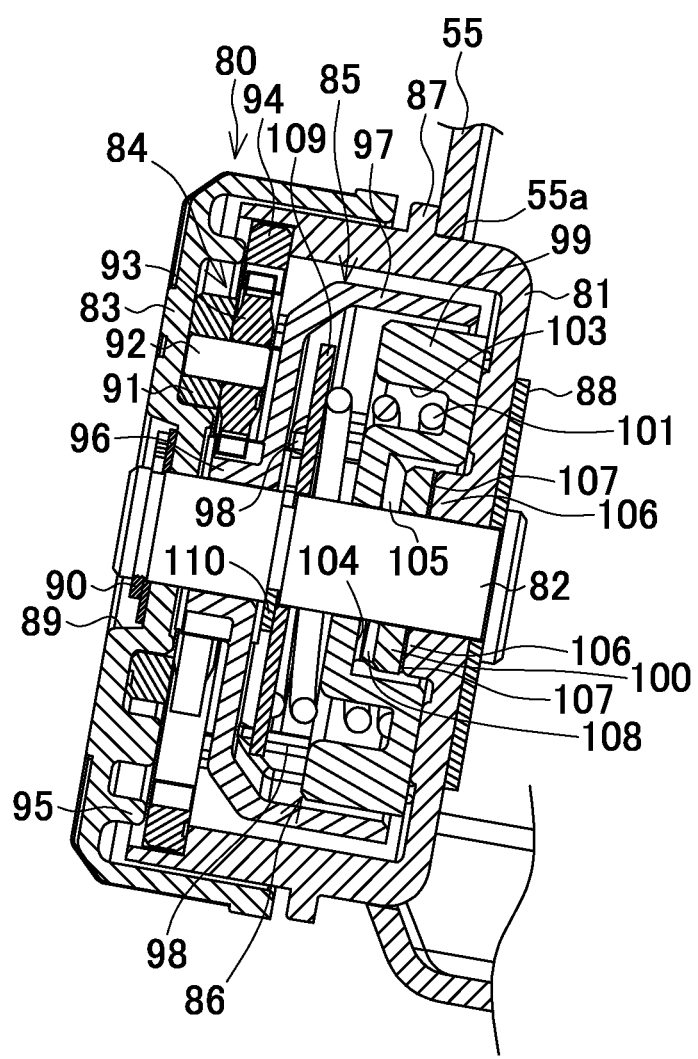
FIG. 12A illustrates a case where a hammer is retreated.

Then, on the front surface lower portion of the box main body 55, a vibration applicator 80 as a vibration application unit is disposed. As illustrated in FIGS. 8 and 9, and FIG. 12(A), the vibration applicator 80 includes a base 81, a support shaft 82, an operation knob 83, an accelerator 84, an output cylinder 85, and a cam unit 86. The base 81 is secured to the box main body 55, has an open front side, and has a shape of a cylinder with a closed bottom. The support shaft 82 is penetratingly secured to the center of the base 81 and projects forward. The operation knob 83 is disposed on the front end of the support shaft 82 and is a rotatable operating member. The accelerator 84 is disposed at the rear of the operation knob 83 and accelerates the rotation of the operation knob 83. The output cylinder 85 is disposed at the rear of the accelerator 84 and is rotated by an output from the accelerator 84. The cam unit 86 converts the rotation of the output cylinder 85 into a vibration in the front-rear direction.

The base 81 is secured by fitting a rear end to a circular hole 55a formed on the front surface of the box main body 55, and positioned at a position projecting from the box main body 55 by bringing a flange 87 disposed on an outer periphery in contact with the front surface of the box main body 55.

The support shaft 82 is a headed shaft body, and penetratingly secured from a backside surface of the base 81 via a washer 88.

The operation knob 83 has a circular cap shape covering the base 81 from the front side, and rotatably coupled while the center of a circular depressed portion 89 formed at the center is passed through by the front end of the support shaft 82 and retained by a stop ring 90.

The accelerator 84 includes a carrier 91, a plurality of planetary gears 93, and an internal gear 94. The carrier 91 is secured to a peripheral area of a projecting portion inwardly projected by the circular depressed portion 89 of the operation knob 83. The plurality of planetary gears 93 are supported to the carrier 91 on the rear side via pins 92. The internal gear 94 is fitted and held onto the vicinity of an opening of the base 81, and the planetary gears 93 are meshed with the internal gear 94. The operation knob 83 has a backside surface on which a rib 95 close to a front surface of the internal gear 94 is circularly disposed.

The output cylinder 85 includes a gear portion 96 and a large diameter portion 97. The gear portion 96, through which the support shaft 82 is movably inserted, is meshed with the planetary gears 93. The large diameter portion 97 is installed consecutively to the gear portion 96 and expanded at the rear of the accelerator 84. The output cylinder 85 is rotatable by revolutions of the planetary gears 93 via the gear portion 96. As illustrated in FIG. 9, a plurality of projections 98, 98 . . . are axially formed on an inner peripheral surface of the large diameter portion 97 circumferentially at regular intervals.

The cam unit 86 includes a hammer 99, a cam 100, and a coil spring 101. The hammer 99 is a hammering element passed through by the support shaft 82 and axially movable back and forth in the large diameter portion 97. The cam 100 is passed through by the support shaft 82 at the rear of the hammer 99 and secured to a bottom surface of the base 81. The coil spring 101 presses the hammer 99 to the cam 100 side.

The hammer 99 has a disk shape having an outer diameter fitted into the large diameter portion 97, and as illustrated in FIGS. 9 and 10, a plurality of depressed grooves 102, 102 . . . , with which the projections 98 of the large diameter portion 97 are engaged, are axially disposed on an outer peripheral surface. Accordingly, the hammer 99 is slidable in the axial direction in the large diameter portion 97 in a state where the rotation is restricted. The hammer 99 has a front surface on which a ring groove 103 that receives the rear end of the coil spring 101 is formed over the whole circumference, and a circular depressed portion 104 opening rearward is formed inside the ring groove 103. The depressed portion 104 has a bottom surface on which four front cam stops 105, 105 . . . , which have heights gradually increasing rearward along the circumferential direction, are formed at regular intervals.

The cam 100 has a disk shape having an outer diameter fitted into the depressed portion 104 of the hammer 99, and as illustrated in FIG. 11, engaging grooves 107, 107 . . . , with which ribs 106, 106 . . . radially disposed on the bottom center of the base 81 are engaged, are radially disposed on a rear surface. Accordingly, the cam 100 is secured to the bottom of the base 81 in a state where the rotation is restricted. The cam 100 has a front surface on which four rear cam stops 108, 108 . . . , which have heights gradually increasing forward along the circumferential direction, are formed at regular intervals. The rear cam stop 108 has an inclined direction same as that of the front cam stop 105 of the hammer 99.

The coil spring 101 has a front end received by a receiving washer 109, through which the support shaft 82 is movably inserted, in the large diameter portion 97 of the output cylinder 85. The receiving washer 109 has an advance position restricted by a stop ring 110, which is disposed at a narrowed portion of the support shaft 82, so as to be contactless with the large diameter portion 97. Accordingly, the hammer 99 is pressed rearward to abut on the cam 100 by biasing by the coil spring 101 as illustrated in FIG. 8 and FIG. 12(A).

(Installation of Dust Collector to Hammer Drill)

In the dust collection system S configured as described above, when the dust collector 20 to which the dust box 22 is installed is installed on the hammer drill 1, first, the locking shafts 29, 29 of the body case 21 are each locked to the receiving portion of the motor housing 3. Next, from the inclined posture, the upper side of the dust collector 20 is pushed up rearward to be rotated so as to be fitted to the front surface of the hammer drill 1. Then, the hook 32 of the swing plate 31 is brought in contact with the stop 14 of the front housing 5 to sink into the guide groove 30 of the upper side portion 26, thus swinging the swing plate 31 to the downward position. When the hook 32 runs over the stop 14, the swing plate 31 swings to the upward position to cause the hook 32 to project upward. Accordingly, the hook 32 is locked to the stop 14, thus completing the installation.

With the installation of the dust collector 20, the contact pin 68, which passes through the square hole 27 of the body case 21, projects from the dust-collector-side exhaust port 63 and is brought in contact with a shutter member 15 that closes the upper inlet 12 in the ordinary state, and the shutter member 15 is lain down rearward to open the upper inlet 12 as illustrated in FIG. 2. Simultaneously, the sealing member 65 of the dust-collector-side exhaust port 63 is brought in close contact with the peripheral area of the upper inlet 12, so as to cause the dust-collector-side exhaust port 63 to communicate with the upper inlet 12 in a sealed state. Thus, a dust collecting route is coupled to an intake route. The dust collecting route is a route from the suction opening 46 to the dust-collector-side exhaust port 63 via the nozzle 24, the flexible hose 45 inside the sliding portion 23, the intermediate cylinder 37, from the square cylinder 69 of the dust box 22 to the inside of the box main body 55, and the filter housing portion 58. The intake route is a route from the upper inlet 12 to the fan of the fan housing chamber 11.

(Drilling by Bit)

Then, the initial position of the rear stopper 51 on the rail 49 of the sliding portion 23 is adjusted such that the distal end of a bit is positioned on the suction opening 46 projected to be biased with the sliding portion 23, thus adjusting the position of the front stopper 50 in accordance with the drilling depth. Subsequently, the suction opening 46 is brought in contact with a surface to be drilled and the switch lever 8 of the hammer drill 1 is performed with a push operation to turn ON the switch, so as to drive the motor to rotate the output shaft. At this time, when the drill mode or the hammer drill mode is selected by the change lever, the bit rotates to allow drilling of the surface to be drilled, and as the drilling proceeds, the bit passes through the suction opening 46 and the sliding portion 23 is relatively retreated from the supporting arm 40 against the biasing by the spiral spring. At this time, the receiving cylinder portion 38 relatively advances inside the sliding portion 23 via the slit 43, thus contracting the flexible hose 45.

(Dust Collecting Action)

Meanwhile, due to the rotation of the fan caused by the rotation of the output shaft, the outside air is suctioned from the lower inlet of the motor housing 3, and after the outside air passes the motor to be cooled, the outside air passes through the fan housing chamber 11 so as to be discharged from the side exhaust outlets 13.

Simultaneously, a suctioning force is generated on the suction opening 46 of the dust collector 20, and air is suctioned from the suction opening 46 with dust generated in the drilling, passes through the flexible hose 45 via the nozzle 24, and enters into the square cylinder 69 of the dust box 22 from the intermediate cylinder 37.

Then, the air exited from the square cylinder 69 flows along the guide passage 70 of the box main body 55, goes around to the front side of the filter housing portion 58, and passes through the filter 61 from the front side of the filter 61. Accordingly, the comparatively large dust is separated when the air goes around the guide passage 70 and falls into the dust collecting chamber 77 of the box main body 55, while the comparatively small dust is captured by the filter 61 to be fallen or directly accumulated on a front side surface of the filter 61. The air that has passed through the filter 61 is discharged outside the dust box 22 passing through the dust-collector-side exhaust port 63, reaches the fan housing chamber 11 from the upper inlet 12, and is discharged from the side exhaust outlets 13.

(Removal of Dust Accumulated on Filter)

Figure 12B:
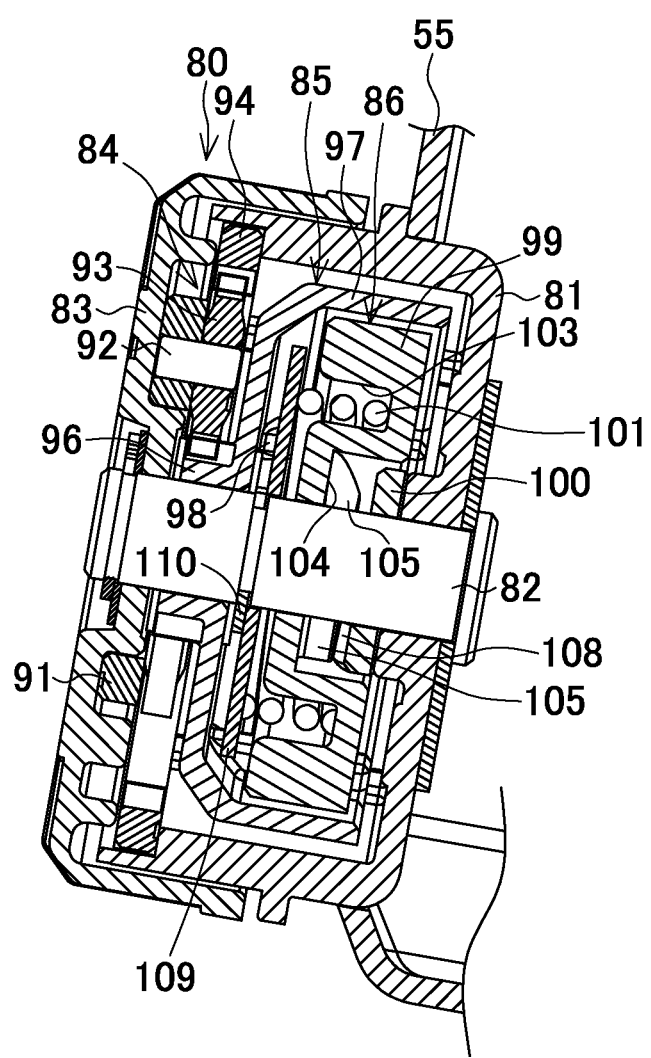
FIG. 12B illustrates a case where the hammer is advanced.

In removing the dust accumulated on the filter 61 after the work terminates, in the vibration applicator 80, the operation knob 83 is operated to be rotated in an arrow direction indicated on the surface. Then, in the accelerator 84, the carrier 91 is integrally rotated to cause the planetary gears 93 supported to the carrier 91 to revolve in the internal gear 94, thus transmitting the accelerated rotation to the gear portion 96 of the output cylinder 85. Accordingly, the rotation of the output cylinder 85 also rotates the hammer 99 integrated with the output cylinder 85 in the large diameter portion 97 (the rotation direction is same as that of the operation knob 83). Then, as illustrated in FIG. 12, the front cam stop 105 runs on the rear cam stop 108 having the same inclined direction as that illustrated in FIG. 12(B) from the state of FIG. 12(A), and advances against the biasing by the coil spring 101. Subsequently, when the front cam stop 105 runs over the rear cam stop 108, the front cam stop 105 is retreated by the biasing by the coil spring 101 again as illustrated in FIG. 12(A), and collides against the cam 100 and the base 81. By repeatedly performing the back and forth movement during the rotating operation of the operation knob 83, the generated vibration is transmitted to the box main body 55 via the base 81 to vibrate the filter housing portion 58 via the lid body 57, thus vibrating the filter 61 to remove the dust accumulated on the filter 61.

(Removal of Dust Collector and Discharge of Dust)

When the dust collector 20 is removed, pushing the button 34 causes the swing plate 31 to swing to the downward position to release the hook 32 from the stop 14. Then, in this state, rotating the dust collector 20 as bringing down forward ensures releasing the locking shafts 29 from the receiving portion of the motor housing 3 to remove the dust collector 20. Simultaneously with the removing, the contact pin 68 moves forward to release the pushing of the shutter member 15. Accordingly, the shutter member 15 returns to a standing position to obstruct the upper inlet 12.

The dust is discharged from the dust box 22 as follows: the distal end of the operating member 74 of the box main body 55 is pushed from the forward of the body case 21 to release the lock of the attaching/detaching locking claw 75 to the locking stepped portion 35, thus tilting the dust box 22 forward around the shaft portion 36 to directly remove the dust box 22 from the body case 21. Next, the loop portion 64 of the lid body 57 is released from the lid locking claw 72 to open the lid body 57 from the box main body 55, thus discharging the dust accumulated in the dust collecting chamber 77.

(Effects of Invention According to Vibration Applicator)

As described above, with the dust collector 20 having the above-described configuration and the hammer drill 1 on which the dust collector 20 is installed, since the dust box 22 includes the vibration applicator 80 configured to apply a vibration, the vibration applicator 80 can apply the vibration to the filter 61 to effectively remove the accumulated dust. Accordingly, the clogging of the filter 61 can be easily prevented at low cost.

Especially, here, since the vibration applicator 80 is disposed at the dust box 22, the vibration can be effectively applied to the filter 61, and improvement of the effect to prevent the clogging can be expected.

Since the vibration by the vibration applicator 80 is applied parallel to a ventilation direction (here, front-rear direction) to the filter 61, the vibration effective to remove the dust can be applied to a ventilation surface of the filter 61 to which the dust is easily accumulated.

Furthermore, since the vibration applicator 80 includes the operation knob 83 and applies the vibration in accordance with the rotating operation of the operation knob 83, the vibration can be applied to the dust box 22 with a simple operation.

In addition, since the vibration applicator 80 includes the cam unit 86 configured to convert the rotation in accordance with the rotating operation of the operation knob 83 into the back and forth movement of the hammer 99 to generate the vibration, the rotating operation can be converted into the back and forth movement of the hammer 99 to efficiently generate the vibration. In addition, the vibration applicator 80 can be compactly formed.

Then, since the accelerator 84 configured to accelerate the rotation of the operation knob 83 is included, the back and forth movement of the hammer 99 can be increased via the accelerator 84 even with a little rotating operation of the operation knob 83, and the dust can be effectively removed even with the rotating operation for a short period.

Since the vibration applicator 80 is disposed on the front surface lower portion in the posture of being installed on the hammer drill 1, the vibration applicator 80 is less likely to hinder the work even if the vibration applicator 80 projects from the dust collector 20.

While a planetary gear reduction mechanism with one stage is employed as the accelerator in the embodiment described above, two stages or more may be disposed to ensure further acceleration. However, not limited the accelerator including the planetary gear, the accelerator can be configured by combining a bevel gear, a spur gear, and the like. The accelerator may be omitted.

Also for the cam unit, changes of design can be made as necessary, for example, the heights and the number of the front and rear cam stops can be changed, or the cam can be integrated with the base to form the rear cam stop on the bottom surface of the base.

The operating member is also not limited to the operation knob in the above-described embodiment, the rotating operation may be performed with a lever or a tab. The rotating operation can be performed using a tool such as a hexagonal bar wrench.

While the above-described embodiment has the structure where the hammering element (hammer) is moved back and forth to apply the vibration, the structure may be as follows. For example, a resilient member, such as a leaf spring with a weight, is engaged with a cam plate integrally rotated with a support shaft, and a cam projection of the rotating cam plate passes through the lower side of the resilient member, thus swinging the resilient member to apply the vibration. In the structure, the operating member can swing the resilient member by a sliding operation. That is, the operating member is not limited to the operating member for the rotating operation.

Furthermore, while the vibration applicator is disposed on the front surface lower portion of dust box in the above-described embodiment, the vibration applicator may be disposed on the upper portion or the side portion of the dust box depending on the ventilation direction to the filter and the like, or the vibration applicator can be disposed on the upper portion or the side portion of not the dust box but the body case to indirectly apply the vibration to the dust box. A plurality of the vibration applicators may be disposed.

The vibration application unit of the present invention can be employed even if the configuration of the dust collector itself has, for example, a structure where the dust box is not attachable/detachable, or a structure where a fan for dust collection is included in a body case to be driven by a power obtained from a hammer drill without using a fan on the hammer drill side as the above-described embodiment.

In addition, the configuration of the hammer drill may be a configuration where the motor is disposed sideways, or not an AC machine but a DC machine that uses a battery pack as a power source may be employed. Needless to say, the invention is applicable to other electric power tools, such as an electric drill, not limited to the hammer drill, insofar as the dust collector is installable.

The invention claimed is:

1. A dust collector for an electric power tool, comprising:
   a body case that has an exhaust outlet and is installable on the electric power tool; a dust box;
   a filter internal to the dust box;
   a nozzle that is connected to the body case and has a suction opening at a front end;
   a dust collecting route from the suction opening to the exhaust outlet passing through the filter; and
   a vibration applicator that applies a vibration to the dust box, wherein the vibration is applied parallel to a ventilation direction of the filter, wherein
   the vibration applicator includes
      a knob and applies the vibration in accordance with a rotating operation of the knob,
      a cam assembly configured to convert the rotating operation into a back and forth movement of a hammering element to generate the vibration,
      a base that is cylindrical with a closed bottom and includes a support shaft,
      the base is secured to a side corresponding to the dust box and has an open front side,
      the support shaft is penetratingly secured to a center of the base,
      the support shaft projects forward, and
      the knob is rotatable on a front end of the support shaft.

2. The dust collector for the electric power tool according to claim 1, wherein
   the cam assembly includes the hammering element, a cam, and a coil spring,
   the hammering element passes through by the support shaft,
   the hammering element is movable back and forth in an axial direction,
   the cam passes through by the support shaft at a rear of the hammering element,
   the cam is secured to a bottom surface of the base, and
   the coil spring presses the hammering element to a side corresponding to the cam.

3. A dust collector for an electric power tool, comprising:
   a body case that has an exhaust outlet and is installable on the electric power tool;
   a dust box;
   a filter internal to the dust box;
   a nozzle that is connected to the body case and has a suction opening at a front end;
   a dust collecting route from the suction opening to the exhaust outlet passing through the filter; and
   a vibration applicator that applies a vibration to the dust box, wherein
   the vibration applicator includes a knob and applies the vibration in accordance with a rotating operation of the knob, and the vibration applicator includes a cam assembly configured to convert the rotating operation into a back and forth movement of a hammering element to generate and apply the vibration to the dust box, wherein
the vibration applicator includes a base that is secured to the dust box, and
the hammering element moves back and forth and collides the base to generate vibration.

* * * * *